United States Patent [19]
Armstrong

[11] Patent Number: 5,204,967
[45] Date of Patent: Apr. 20, 1993

US005204967A

[54] SORTING SYSTEM USING CASCADED MODULES WITH LEVELS OF MEMORY CELLS AMONG WHICH LEVELS DATA ARE DISPLACED ALONG ORDERED PATH INDICATED BY POINTERS

[76] Inventor: Philip N. Armstrong, 18 Elk Run, Monterey, Calif. 93940

[21] Appl. No.: 492,585

[22] Filed: Mar. 13, 1990

Related U.S. Application Data

[63] Continuation-in-part of Ser. No. 816,062, Jan. 3, 1986, abandoned, which is a continuation-in-part of Ser. No. 615,102, May 29, 1984, abandoned.

[51] Int. Cl.$^5$ .............................................. G06F 7/24
[52] U.S. Cl. ................. 395/800; 364/222.9; 364/232.7; 364/246.3; 364/259.2; 364/284.3; 364/929.2; 364/957.3; 364/DIG. 1; 340/146.2; 395/425
[58] Field of Search ............................. 395/800, 425; 340/146.2

[56] References Cited

U.S. PATENT DOCUMENTS

| | | | |
|---|---|---|---|
| 3,745,533 | 7/1973 | Erwin et al. | 340/172.5 |
| 3,781,812 | 12/1973 | Uymore et al. | 340/172.5 |
| 4,051,551 | 9/1977 | Lawrie et al. | 364/260 |
| 4,110,837 | 8/1978 | Chen | 364/900 |
| 4,131,947 | 12/1978 | Armstrong | 364/900 |
| 4,520,456 | 5/1985 | Mirarker et al. | 364/900 |
| 4,524,428 | 6/1985 | Grinberg et al. | 364/900 |
| 4,541,048 | 9/1985 | Propster et al. | 364/200 |
| 4,595,995 | 6/1986 | Alles | 364/900 |

*Primary Examiner*—Thomas C. Lee
*Assistant Examiner*—Ken S. Kim

[57] ABSTRACT

A self-sorting memory system (SSM) in which records to be sorted are stored in selected memory cells in random access memories. The system is constructed so that the amount of time required to sort the records depends only on the number of records to be sorted, that is, the sorting time depends upon the time required to feed the unsorted records serially into the system and the time required to output the sorted records serially from the system. The system also has the feature that additional unsorted records may be fed into the system and sorted with records already in the system after sorted records have been partially withdrawn from the system. The system is also capable of operating in a non-destruct mode in which sorted output records are returned to the system. For economical construction the system is made up of a plurality of identical modules, and the words making up each record are distributed among the modules for simultaneous processing.

10 Claims, 9 Drawing Sheets

OUTPUT MODE - FIRST STEP

FIG. 1

|  | 0 | 1 | 2 | 3 | 4 | 5 | 6 | 7 | 8 |
|---|---|---|---|---|---|---|---|---|---|
| LEVEL 2 | y xx<br>y xx<br>y xx | y xx<br>y xx<br>y xx | y xx<br>y xx<br>y xx | y xx<br>y xx<br>y xx | y xx<br>y xx<br>y xx | y xx<br>y xx<br>y xx | y xx<br>y xx<br>y xx | y xx<br>y xx<br>y xx | y xx<br>y xx<br>y xx |

|  | 0 | 1 | 2 |
|---|---|---|---|
| LEVEL 1 | $y=2$ xx<br>$y=1$ xx<br>$y=0$ xx | $y=4$ xx<br>$y=5$ xx<br>$y=3$ xx | $y=8$ xx<br>$y=7$ xx<br>$y=6$ xx |

LEVEL 0:
$y=2$ xx
$y=0$ xx
$y=1$ xx

RECORD STORAGE POSITIONS WITHIN THE MEMORY CELLS OF THE SSM

FIG. 2

|  | 0 | 1 | 2 | 3 | 4 | 5 | 6 | 7 | 8 |
|---|---|---|---|---|---|---|---|---|---|
| LEVEL 2 | y xx<br>y xx<br>y xx | y xx<br>y xx<br>y xx | y xx<br>y xx<br>y xx | y xx<br>y xx<br>y xx | y xx<br>y xx<br>y xx | y xx<br>y xx<br>y xx $\overline{C_{25}}$ | y xx<br>y xx<br>y xx | y xx<br>y xx<br>y xx | y xx<br>y xx<br>y xx |

|  | 0 | 1 | 2 |
|---|---|---|---|
| LEVEL 1 | 2 xx<br>1 xx<br>0 xx | 4 xx<br>5 xx<br>3 xx<br>$\overline{C_{11}}$ | 8 xx<br>7 xx<br>6 xx |

LEVEL 0:
2 xx
0 xx
1 xx
$\overline{C_{00}}$

INPUT MODE

FIG. 3

| | 0 | 1 | 2 | 3 | 4 | 5 | 6 | 7 | 8 |
|---|---|---|---|---|---|---|---|---|---|
| LEVEL 2 | y xx | y xx | y xx | y xx | y xx | y xx | y xx | y xx | y xx |
| | y xx | y xx | y xx | y xx | y xx | y xx | y xx | y xx | y xx |
| | y xx | y xx | y xx | y xx | y xx | y xx | y xx | y xx | y xx |

| | | A | | | 1 | | | 2 | |
|---|---|---|---|---|---|---|---|---|---|
| LEVEL 1 | | 2 xx | | | 5 xx | | | 8 xx | |
| | | 1 xx | | | 4 xx | | | 7 xx | |
| | | 0 xx | | | 3 xx | | | 6 xx | |

| | | | | | 2 xx | | | | |
|---|---|---|---|---|---|---|---|---|---|
| LEVEL 0 | | | | | 0 xx | | | | |
| | | | | | 1 20 | | | | |

FIRST RECORD AND POINTER IN STORAGE

FIG. 4

| | 0 | 1 | 2 | 3 | 4 | 5 | 6 | 7 | 8 |
|---|---|---|---|---|---|---|---|---|---|
| LEVEL 2 | y xx | y xx | y xx | y xx | y xx | y xx | y xx | y xx | y xx |
| | y xx | y xx | y xx | y xx | y xx | y xx | y xx | y xx | y xx |
| | y xx | y xx | y xx | y xx | y xx | y xx | y xx | y xx | y xx |

| | | A | | | 1 | | | 2 | |
|---|---|---|---|---|---|---|---|---|---|
| LEVEL 1 | | y xx | | | y xx | | | y xx | |
| | | y xx | | | y xx | | | y xx | |
| | | y xx | | | y xx | | | y xx | |

| | | | | | 2 20 | | | | |
|---|---|---|---|---|---|---|---|---|---|
| LEVEL 0 | | | | | 0 4 | | | | |
| | | | | | 1 1 | | | | |

CELL AT LEVEL 0 FILLED

FIG. 5

| LEVEL 2 | 0 | 1 | 2 | 3 | 4 | 5 | 6 | 7 | 8 |
|---|---|---|---|---|---|---|---|---|---|
| | y xx | y xx | y xx | y xx | y xx | y xx | y xx | y xx | y xx |
| | y xx | y xx | y xx | y xx | y xx | y xx | y xx | y xx | y xx |
| | y xx | y xx | y xx | y xx | y xx | y xx | y xx | y xx | y xx |

| LEVEL 1 | 0 | 1 | 2 |
|---|---|---|---|
| | 0 20 | y xx | y xx |
| | 2 19 | y xx | y xx |
| | 1 9 | y xx | y xx |

| LEVEL 0 | |
|---|---|
| | 2 8 |
| | 0 4 |
| | 1 1 |

ONE CELL AT LEVEL 1 FILLED

FIG. 6

| LEVEL 2 | 0 | 1 | 2 | 3 | 4 | 5 | 6 | 7 | 8 |
|---|---|---|---|---|---|---|---|---|---|
| | y xx | y xx | y xx | y xx | y xx | y xx | y xx | y xx | y xx |
| | y xx | y xx | y xx | y xx | y xx | y xx | y xx | y xx | y xx |
| | y xx | y xx | y xx | y xx | y xx | y xx | y xx | y xx | y xx |

| LEVEL 1 | 0 | 1 | 2 |
|---|---|---|---|
| | 0 20 | 3 18 | 8 39 |
| | 2 19 | 5 8 | 7 38 |
| | 1 9 | 4 7 | 6 30 |

| LEVEL 0 | |
|---|---|
| | 2 4 |
| | 0 2 |
| | 1 1 |

ALL CELLS AT LEVEL 1 FILLED

FIG. 7

|       | 0    | 1    | 2    | 3    | 4    | 5    | 6    | 7    | 8    |
|-------|------|------|------|------|------|------|------|------|------|
| LEVEL 2 | y xx | y xx | y xx | y xx | y xx | y xx | y xx | y xx | y xx |
|       | y xx | y xx | y xx | y xx | y xx | y xx | y xx | y xx | y xx |
|       | 0 20 | y xx | y xx | y xx | y xx | y xx | y xx | y xx | y xx |

|       | 0   |   |   | 1   |   |   | 2   |   |   |
|-------|-----|---|---|-----|---|---|-----|---|---|
| LEVEL 1 | 2 19 |   |   | 3 18 |   |   | 8 39 |   |   |
|       | 1 9 |   |   | 5 8 |   |   | 7 38 |   |   |
|       | 0 4 |   |   | 4 7 |   |   | 6 30 |   |   |

| LEVEL 0 | 2 3 |
|         | 0 2 |
|         | 1 1 |

*FIRST RECORD IN LEVEL 2 CELL*

FIG. 8

|       | 0    | 1    | 2    | 3    | 4    | 5    | 6    | 7    | 8    |
|-------|------|------|------|------|------|------|------|------|------|
| LEVEL 2 | y 37 | y 36 | y 34 | y 31 | y 32 | y 27 | y 39 | y 25 | y 28 |
|       | y 20 | y 35 | y 33 | y 22 | y 29 | y 26 | y 38 | y 21 | y 24 |
|       | y 19 | y 13 | y 12 | y 18 | y 23 | y 10 | y 30 | y 17 | y 16 |

|       | 0    |   |   | 1    |   |   | 2    |   |   |
|-------|------|---|---|------|---|---|------|---|---|
| LEVEL 1 | 2 11 |   |   | 3 8  |   |   | 8 15 |   |   |
|       | 1 9  |   |   | 5 7  |   |   | 7 14 |   |   |
|       | 0 4  |   |   | 4 5  |   |   | 6 6  |   |   |

| LEVEL 0 | 2 3 |
|         | 0 2 |
|         | 1 1 |

*LEVEL 2 FILLED: END OF INPUT*

FIG. 9

|  | 0 | 1 | 2 | 3 | X<br>4 | 5 | 6 | 7 | 8 |
|---|---|---|---|---|---|---|---|---|---|
| LEVEL 2 | y 37<br>y 20<br>y 19 | y 36<br>y 35<br>y 13 | y 34<br>y 33<br>y 12 | y 31<br>y 22<br>y 18 | y B<br>y 32<br>y 29 | y 27<br>y 26<br>y 10 | y 39<br>y 38<br>y 30 | y 25<br>y 21<br>y 17 | y 28<br>y 24<br>y 16 |

|  | 0 | X<br>1 | 2 |
|---|---|---|---|
| LEVEL 1 | 2 11<br>1 9<br>0 4 | 4 23<br>3 8<br>5 7 | 0 15<br>7 14<br>6 6 |

| LEVEL 0 | 1 5<br>2 3<br>0 2 |

OUTPUT MODE - FIRST STEP

FIG. 10

|  | 0 | 1 | 2 | 3 | 4 | 5 | 6 | 7 | 8 |
|---|---|---|---|---|---|---|---|---|---|
| LEVEL 2 | y 100<br>y 37<br>y 20 | y 36<br>y 35<br>y 13 | y 34<br>y 33<br>y 12 | y 31<br>y 22<br>y 18 | y B<br>y 32<br>y 29 | y 27<br>y 26<br>y 10 | y 39<br>y 38<br>y 30 | y 25<br>y 21<br>y 17 | y 28<br>y 24<br>y 16 |

|  | 0 | X<br>1 | 2 |
|---|---|---|---|
| LEVEL 1 | 0 19<br>2 11<br>1 9 | 4 23<br>3 8<br>5 7 | 8 15<br>7 14<br>6 6 |

| LEVEL 0 | 1 5<br>0 4<br>2 3 |

| | | | | | | | | | |
|---|---|---|---|---|---|---|---|---|---|
| LEVEL 2 | y 100<br>y 37<br>y 20 | y 36<br>y 35<br>y 13 | y 34<br>y 33<br>y 12 | y 31<br>y 22<br>y 18 | y B<br>y 32<br>y 29 | y B<br>y 27<br>y 26 | y 39<br>y 38<br>y 30 | y 25<br>y 21<br>y 17 | y 28<br>y 24<br>y 16 |
| LEVEL 1 | | 0<br>0  19<br>2  11<br>1   9 | | | X<br>1<br>4  23<br>3   8<br>5   7 | | | 2<br>8  15<br>7  14<br>6  10 | |
| LEVEL 0 | | | | | 2  6<br>1  5<br>0  4 | | | | |

THE COMPOSITION OF AN ELEMENT OF A MODULE

AN ELEMENT OF A MODULE

THE COMPOSITION OF AN SSM MODULE FOR WHICH P=2

SIMPLIFIED REPRESENTATION OF AN SSM MODULE

A MODULE OF AN SSM

A SELF-SORTING MEMORY

FIG. 19

TABLE I

| LEVEL | $M_0$ | $M_1$ | $M_2$ | $M_3$ | $M_4$ |
|---|---|---|---|---|---|
| 0 | $a_0$ | $d_0$ | $b_0$ | $e_0$ | $c_0$ |
| 1 | $c_1$ | $a_1$ | $d_1$ | $b_1$ | $e_1$ |
| 2 | $e_2$ | $c_2$ | $a_2$ | $d_2$ | $b_2$ |
| 3 | $b_3$ | $e_3$ | $c_3$ | $a_3$ | $d_3$ |
| 4 | $d_4$ | $b_4$ | $e_4$ | $c_4$ | $a_4$ |

FIG. 20

TABLE II

| WORD PERIOD | $M_0$ | $M_1$ | $M_2$ | $M_3$ | $M_4$ |
|---|---|---|---|---|---|
| 0 | $a_0$ | $b_4$ | $c_3$ | $d_2$ | $e_1$ |
| 1 | $e_2$ | $a_1$ | $b_0$ | $c_4$ | $d_3$ |
| 2 | $d_4$ | $e_3$ | $a_2$ | $b_1$ | $c_0$ |
| 3 | $c_1$ | $d_0$ | $e_4$ | $a_3$ | $b_2$ |
| 4 | $b_3$ | $c_2$ | $d_1$ | $e_0$ | $a_4$ |
| 5 | $a_0$ | $b_4$ | $c_3$ | $d_2$ | $e_1$ |

SORTING SYSTEM USING CASCADED MODULES WITH LEVELS OF MEMORY CELLS AMONG WHICH LEVELS DATA ARE DISPLACED ALONG ORDERED PATH INDICATED BY POINTERS

This application is a Continuation-in-part of Copending Application Ser. No. 816062, filed Jan. 3, 1986 now abandoned; which in turn is a continuation-in-part of Copending Application Ser. No. 615,102, filed May 29, 1984 now abandoned.

BACKGROUND OF THE INVENTION

Potential applications of Self-Sorting Memory of the invention include operations in numerical analysis, such as matrix manipulation, correlation, and other computations commonly performed procedures in applied mathematics. Other potential uses of Self-Sorting Memory include data rearrangement of the contents of data files such as that required in relational data base management in preparation for join, intersection, or other operations on relations, and simply file sorting which is required in nearly every application of computing systems.

The reasons for such diversity of computations to which the Self-Sorting Memory of the invention may be applied are the well-known limitation of conventional single-processor computers when used for rearranging information, and the ubiquitous task of rearranging data in computer applications. it is possible with conventional random access memory components to prepare sorted files rapidly, with time required for fewer serial operations than is consumed with conventional computers.

The Self-Sorting Memory of the present invention has storage for N records and provides for simultaneous access to approximately 0(log N) of these records so that sorting of records can be carried out without the expenditure of any more time than is required for a single scan of the records for input to the memory followed by a second scan for output from the memory.

The Self-Sorting Memory of the present invention may be used as a normal random access memory in a general purpose computer. Computers may be constructed with the self-sorting feature built into the main memory, and incorporating appropriate control for the Self-Sorting Memory in their normal instruction set. Alternatively, the Self-Sorting Memory of the invention may be constructed as an add-on Self-Sorting Memory for existing computers whose control may best be accommodated through the computer's input/output system.

The Self-Sorting Memory system of the present invention is of the same general type as the system described in U.S. Pat. 4,131,947 which issued Dec. 26, 1978 to the present inventor However, unlike the system of the patent, the system of the invention is composed of identical Modules with words which make up the various records being distributed among the Modules so that each Module stores the same number of words. The restriction on the number of words in a record, implicit in the system described in the patent, is thus removed by this change.

SUMMARY OF THE INVENTION

The invention provides a Self-Sorting Memory system in which records to be sorted are stored in selected memory cells in random access memories. The system is constructed so that the amount of time required to sort the records depends only on the total number records to be sorted. That is, sorting time depends upon the amount of time required to transmit the randomly arranged records in serial order to the system and the amount of time required to transmit the sorted records in serial order from the system. The system also has the feature that additional unsorted records may be placed in the system after some of the records have been withdrawn so that all of the remaining records in the SSM may be withdrawn in sorted order. The system is also capable of operating in a non-destruct mode in which sorted output records are returned to the system.

Certain special terms, including some of those used above, will be used in the ensuing specification, and these terms are defined as follows:

CELLS

The memory is partitioned into cells. A cell is composed of the memory capacity required to store p records. The words of the p records of a cell are distributed over the modules so that each module contains the same number of words of each record. The modules are composed of p elements; if a word of a record is in an element of a module, all of the words of that record will be in corresponding elements of the modules, i.e. if the elements of a module Mi ($0\_<i\_<k-1$) are denoted Eij ($0\_<j\_p-1$) and a word of a record is in one of these elements, say EIj for some pair of indices and I and J, all of the words of that record will be in the elements EtJ ($0\_<t\_<k-1$) identified with the index J.

SORTING LEVEL

The term "sorting level" may be described as follows: If a collection of k records Ri ($o\_<i\_<k-1$) is arranged so that $R0<R1<...<Rk-1$, the records are said to form a chain of k records. If there are i records in a chain which are smaller than record Ri, Ri is said to be the (i+1)th member of the chain. Each record in the SSM is a member of a chain of k records (some of which may be blank records) and each record is stored in a cell which contains p records. The cells which contain records which are the ith members of a chain are the cells which are at the ith sorting level which may be donoted Li. The p chains identified by the p respective records in a cell at the (i+1)th sorting level are members of p chains which share the same ith member. The terms "level" and "sorting level" used here are snyonymous.

RECORD

A record is a binary representation of a positive integer. Given any two records $R_i$ and $R_j$, record Ri may be said to be less than $R_j$ if the corresponding relation applies to the integers which the respective records represent. The most significant bits or words of a record determine whether it is larger or smaller than another record; these bits are called the key of the record. The most significant bits of a record key are the record mark bits. The remaining bits which are less significant than the bits of the record key compose the data part of the record.

DATA RECORD

A data record is a record which contains data in its data part.

BLANK RECORD

A z-blank record ("blank") is larger than any record which Where there will be no consequent confusion, a data record, a blank record, or a z-blank record, will be denoted, ambiguously record.

SUCCESSOR AND PREDECESSOR RECORDS

If, for any two records R and R', R<R', R may be called a predecessor of R' and R' may be called a successor of R.

SORTED RECORD SEQUENCE

A record sequence is sorted if, given any two records $R_i$ and $R_j$ in the sequence, $R_i < R_j$ if $i<j$. (It is assumed here that no two records represent the same integer and the first member of the sorted sequence is the smallest member of the sequence. These two assumptions are made only to simplify the exposition and do not represent machine limitations.) If two records are identical, it is clearly inconsequential which appears first in the sorted sequence. If the reversed order is required, it is sufficient to compute the 1's complement of the records in the randomly ordered sequence as they pass to and from the SSM to obtain this ordering.

RECORDS, POINTERS, AND ADDRESSES IN CELLS

Each record is a member of a chain. If Ri is the ith member of a chain ($i<k-1$), it will contain a pointer which identifies the location of the cell which contains the (i+1)th members of the p chains which have for their ith members of the record Ri. The data store of the SSM is composed of identical cells arranged to correspond to the diagram of a tree with k levels $L_i$ ($0<i<k-1$). The index i of $L_i$ may be called the level index of $L_i$. A cell cohtains p record storage positions and p respective, unequal, pointers. The random access memory address of a cell $C_{ij}$ will be denoted $A_{ij}$. There is one cell, which will be denoted $C_{00}$, at $L_0$ and the memory location of cell $C_{00}$ will be denoted $A = A_{00}$. Each record storage position in $C_{00}$ includes a pointer Pq0t ($0<q<p-1$) which identifies one of p cells $C_{ij}$ at $L_1$, if $k>2$; similarly, each cell $C_{ij}$ at $L_i$ ($0<i<k-1$) contains a pointer Pqij ($0<q<p^{i+1}-1$) which identifies a cell at $L_{i+1}$. Pointer Pqk−1,j is vacuous since there is no $L_k$. The pointer q assigned to record Rqij represents the address of cell $C_{i+1,q}$.

The numbers of record storage positions in the cells need not be equal. It is only necessary that if there a cell $C_{i+1,j}$ is at $L_{i+1}$, there will be a record storage position in a cell $C_{ij}$ with the pointer Ptij. If in an SSM each cell contains the same number p of record storage positions, the total number N of record storage positions in the SSM will be the sum $$N = p + p^2 + p^3 + \ldots + p^{k-1} = \frac{p^{k+1} - p}{p - 1}.$$

If a record R is placed in a record storage position of a cell $C_{ij}$, the pointer in that record storage position will be assigned to R; a record in cell $C_{ij}$ which is assigned the pointer Pqij will be denoted Rqij. If some of the records within the record storage positions of a cell are rearranged, but not removed from the cell, they will retain their respective assigned pointers A record which passes from a cell will leave its pointer behind in the vacated record storage position; if a record R in a cell is replaced by another record R', the pointer assigned to R will be removed from R and will be assigned to R'.

CELL SEQUENCE

A Cell Sequence is a sequence of cells which is defined thus:

1. $C_{00}$ is a member of every Cell Sequence.
2. If a cell $C_{i,t(i)}$ (i>0) is a member of a Cell Sequence, there is a record Rt(i)i−1,t(i−1) which is in cell $C_{i-1},t(i-1)$ at $L_{i-1}$. The greatest level index of a cell in a Cell Sequence is denoted I.
3. There is no more than one member of a Cell Sequence at any level.

MODES OF OPERATION

There are three modes of operation with three respective procedures mechanized in the SSM:

INPUT MODE

Successive members of a randomly arranged sequence of records pass to the SSM for storage in the Input Mode.

OUTPUT MODE

The successive members of the input sequence pass from the SSM in the sorted sequence.

SKIM MODE

Let the record pair (R,R') be composed of the least record R in the SSM and an input record R' which passes to the SSM. In the skim mode, the larger record is retained in the SSM and the smaller record passes from the SSM as R' and R are compared. This operation is performed in the amount of time required for one record transmission and may be repeated without delay between successive input records R'.

AN SSM OPERATION

An operation in each mode consists of three parts:
1. Select the successive members of a Cell Sequence.
2. Arrange the I+1 records Rt(i)i,t(i−1) selected from the members of the Cell Sequence and one record, which is transmitted to the SSM, to form a sorted sequence of I+2 records.
3. Shift the records of the sorted sequence in 2. above so that I+1 of the records are placed in respective members of the Cell Sequence and one record is transmitted from the SSM.

Parts of k operations may be performed simultaneously as will be seen below.

BRIEF DESCRIPTION OF THE DRAWINGS

FIG. 1 a schematic representation of the manner in which the records to be sorted are stored in memory cells of the random access memories of the SSM of the invention;

FIGS. 2, 3, 4, 5, 6, 7, and 8 together are schematic representations of the manner in which the records to be sorted are manipulated between the memory cells during the input mode of the operation of the system;

FIGS. 9, 10, and 11 together are schematic representations of the manner in which the records are manipulated between the memory cells during the output mode of operation of the system;

FIG. 12 is a schematic representation of an Element;

FIGS. 19 and 20 together are tables useful in explaining the operation of the system.

DETAILED DESCRIPTION OF THE PREFERRED EMBODIMENT OF THE INVENTION

Figures 11, 12:
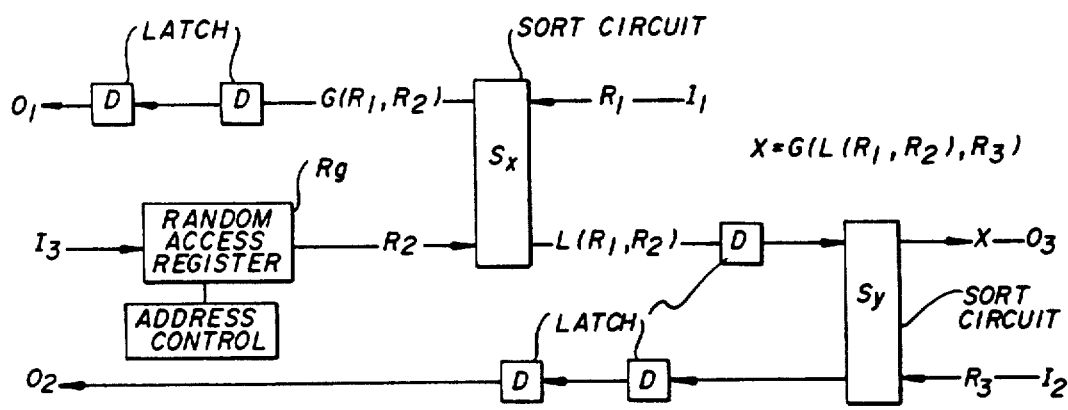
Figure 13:
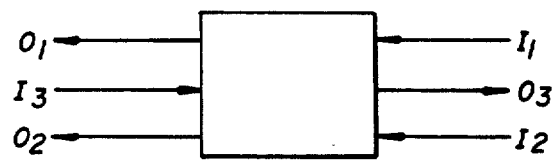
FIG. 13 is a simplified representation of an Element of FIG. 12.

The array of cells for which $k=p=3$ is illustrated in FIG. 1, with contiguous cells being assigned contiguous pointers The lowest level $L_0$ is composed of a single cell, the second level $L_1$ is composed of three cells, $C_{10}$, $C_{11}$, and $C_{12}$; and $L_2$ is composed of nine cells $C_{20}$, $C_{21}$, ... , $C_{28}$. In FIG. 1, y xx represents a record storage position with the pointer being denoted y and the record being denoted xx; at level 2, the highest level, the pointer y is not used and may be arbitrarily assigned or omitted. In the example, the pointers in cells at the highest level are merely denoted y. The pointers in the cells may be considered to be the names of other cells, without arithmetic properties. Thus, the cell $C_{00}$ is assigned the pointers 0, 1, and 2, but for illustration, these pointers are not in an increasing or decreasing sequence; this is also true of cell $C_{11}$ with pointers 4, 5, and 3. At the beginning of the input procedure, as it is mechanized here, any arbitrary cyclic permutation of the pointers at the end of the input procedure is permitted. Once the pointers are assigned in the output or skim modes, however, the assignment must be maintained.

INPUT/OUTPUT OPERATIONS

In all of the input/output operations, each cell of the SSM remains filled with records. If a cell contains a blank record and receives a data record in the input procedure, a blank record will pass from the cell; if a cell contains a data record and receives a blank record in the output procedure, a data record will pass from the cell. At the beginning of the input procedure all of the cells will be filled with blank records, and at the end of the output procedure this condition will be restored. As will be seen later, z-blank records will be used, but such records are not stored in the SSM.

THE INPUT MODE

The input mode for $p=k=3$ is illustrated in FIG. 2. In the input mode, data records displace blank records. It is thus required that at least one member of each Cell Sequence contain a blank record in the input mode. The selection of members of the Cell Sequence is not data-dependent and, except for the above restriction, members of successive Cell Sequences can be arbitrarily selected. The cell $C_{00}$ contains a pointer which identifies each of the cells at $L_1$ and hence each of these cells is a candidate for inclusion in a Cell Sequence. But a cell at $L_1$ contains only three pointers and hence only three of the nine cells can be selected at $L_2$ after selection of a cell at $L_1$. An input operation is composed of the steps required to obtain the placement of an input record R in the sequence composed of R and the largest records in the respective members of a Cell Sequence. The sequence which is obtained is:

$$R^{t(1)}_{00} < R^{t(2)}_{1,t(1)} < \ldots < R^{t(i)}_{i-1,t(i-1)} < R < \ldots < R^{t(I+1)}_{I,t(I)} < B \ldots \ldots B.$$

$$|\text{------}I+1\text{----records------}| \quad |\text{-}(k-I-1)\text{-Blanks-}|$$

The record R may appear at any position in the above chain, including the first, shown occupied by $Rt(1)00$ and the last, shown occupied by $Rt(I+1)I,t(I)$.

A blank record B is transmitted from the SSM and the remaining $I+1$ records are stored in the respective cells $C_{i,t(i)}$ ($0 < i < I$) of the Cell Sequence. The record R which is assigned to the cell $C_{i,t(i)}$ ($i > 0$) is a member of a chain which includes at least one record in $C_{00}$; record R is assigned the pointer $t(i+1)$. The selected records greater than R which are moved from the cells at respective levels $L_r$ to $L_{r+1}$ ($i < r < I$) are assigned the pointers of the records which pass from cells at $L_{r+1}$ to cells at $L_{r+2}$ or from the SSM. The record R thus becomes a member of a chain of $I+1$ records, the least member of which is in $C_{00}$ and the greatest member is in $C_{I,t(I)}$.

THE OUTPUT MODE

The selection of members of the Cell Sequence in the output mode proceeds as follows.

1. If the least record in $C_{00}$ is $Rt(1)00$, $C_{1,t(1)}$ is a member of the Cell Sequence.
2. If $Rt(i)i-1,t(i-1)$ is the least record in the member $C_{i-1,t(i-1)}$ of the Cell Sequence, $C_{i,t(i)}$ is a member of the Cell Sequence.

Thus there is the chain of $I+1$ records:

$$R^{t(1)}_{00} < R^{t(2)}_{1,t(1)} < \ldots < R^{t(I)}_{I-1,t(I-1)} < R^{t(I+1)}_{I,t(I)} < \ldots < B.$$

$$|\text{------}I+1 \text{ Records------}|$$

Each record, $Rt(i+1)it(i)$ ($0 < i < I$), of this chain is the least record in the member $C_{it(i)}$ of the Cell Sequence. The record $Rt(i+1)it(i)$ receives the pointer $t(i)$ and is transmitted for storage to the selected member $C_{i-1,t(i-1)}$ of the Cell Sequence at $L_{i31\ 1}$ ($i > 1$). The selected record from C is the least record in the SSM and is transmitted from the SSM.

THE SKIM MODE

The skim mode is identical to the output mode with the exception of the substitution of an input record R' for the blank record in the output mode, with the result that the record $\underline{R}$ which is the smaller of R' and the smallest record $\overline{R}$ in the SSM, will pass from the SSM. The larger record $\overline{R}$ will be made a member of the chain which includes the (new) least record in cell $C_{00}$ as well as the I remaining records in the members of the Cell Sequence.

AN EXAMPLE

The manipulation of records in the three modes can be illustrated with an example. Suppose $p=k=3$. The SSM represented by the tableau illustrated in FIG. 1.

As records pass to the SSM in the input mode, many choices are possible, since the selection of members of a Cell Sequence is not data-dependent. The procedure which will be illustrated here will consist of filling the cells at the successive levels so that no records will be placed in a cell at $L_i$ before the cells at $L_{i-1}$ are filled. For illustrative purposes, the arrangement of "records" is the random arrangement of the first 39 integers shown thus:

| Index  | 1  | 2  | 3  | 4  | 5  | 6  | 7  | 8  | 9  | 10 | 11 | 12 | 13 |
|--------|----|----|----|----|----|----|----|----|----|----|----|----|----|
| Record | 20 | 1  | 4  | 8  | 9  | 19 | 7  | 18 | 2  | 30 | 38 | 39 | 3  |
| Index  | 14 | 15 | 16 | 17 | 18 | 19 | 20 | 21 | 22 | 23 | 24 | 25 | 26 |
| Record | 13 | 37 | 12 | 36 | 35 | 11 | 34 | 33 | 10 | 22 | 31 | 32 | 23 |
| Index  | 27 | 28 | 29 | 30 | 31 | 32 | 33 | 34 | 35 | 36 | 37 | 38 | 39 |
| Record | 29 | 26 | 27 | 5  | 16 | 17 | 6  | 25 | 15 | 21 | 28 | 14 | 24 |

The reason for selecting consecutive integers is to simplify the task of the reader in following the passage of records within the SSM. Any arbitrary selection of integers would suffice, e.g. 39 records represented by integers $I_i$ in the range $0 < I_i < 256^{1000}$ for $1 < i < 39$, if 1000 eight bit words per record are desired. (Such record lengths are, of course, commonplace in data processing.)

The first record to pass to the SSM is 20, the second 1, etc. The tableau after the first record has passed into the SSM is shown in FIG. 3, and the tableau after the first three records have passed into the system is shown in FIG. 4.

When one cell at $L_1$ is filled, the tableau takes the form shown in FIG. 5. When the cells at $L_1$ are filled the tableau takes the form shown in FIG. 6. When the first record appears in a cell in $L_2$, the tableau takes the form shown in FIG. 7. At the end of the input operation the distribution of records in the memory cells is as shown in FIG. 8.

When the configuration of FIG. 8 is reached, the output procedure may begin. The first Cell Sequence is composed of $C_{00}$, $C_{11}$, and $C_{24}$, since the least record in $C_{00}$ has the pointer 1, the least record in $C_{11}$ has the pointer 4, and the pointers in the cells at $L_2$ may be ignored. At the end of the first output step, the result is as shown in FIG. 9. The output operation may continue until all of the records have been removed from the SSM.

Suppose, however, that a data record 100 is transmitted in the skim mode after this first removal. The least record, 2, in the SSM will be displaced from $C_{00}$, the cell $C_{10}$ identified by the pointer assigned to 2 in $C_{00}$ will be selected and 4 will pass to $C_{00}$ from $C_{10}$, and $C_{20}$ will be selected so that 19 will pass to $C_{10}$, because the pointer appended to 4 was 0, to obtain the array shown in FIG. 10.

The Cell Sequence is selected in the Skim Mode precisely in the manner of the procedure for the Output Mode. It is not necessary to determine the presence of a blank in a cell of the Cell Sequence, since space will be available for the larger record retained in the SSM. The record 100 is thus compared with the least record, which is 4, in $C_{00}$, thus displacing 4,. Withdrawal of the next record by displacement in the Output Procedure will produce the array of FIG. 11.

Now suppose the supply of records in the SSM is to be augmented by one record. This requires exterior storage of the location of the blank space, B, in $C_{26}$ which was last inserted. This blank space will contain a pointer to the prior blank space, in this instance, $C_{25}$. At least one member of the selected Cell Sequence must include a blank, and hence the cell which contains a pointer to $C_{26}$. Thus the cell $C_{12}$ at $L_1$ is selected and the requisite input operation can be executed, filling the cell with the pointer 5 at $L_2$. This pointer 5 replaces the pointer 6 in external storage for the next insertion operation or, if a blank is inserted, this pointer 5 is appended to it and the location of the new blank is retained in external memory.

MECHANIZATION OF THE SSM

The mechanization described here will serve to illustrate the kind of machinery which is required. In the particular design to be described, the number k of levels in the tree to which the cell arrangement corresponds must be an odd positive integer. The value k=5 is chosen for this design. Each record in the SSM will then contain four data words and will be associated with a pointer, forming a collection of five words; these five words will be called a "record" for convenience, although only four of the words will contain data and the last word will be the pointer of the record. If a record must contain more than five words it will contain a multiple of five words and the pointer will be its last (least significant) word. Each cell has provision for storage of p records. In this design, p=2.

The SSM is thus composed of five identical Modules, each of which contains two Elements. Each Module will contain one word of each record. The composition and operation of an Element, a Module, the system of Modules, and the manipulation of pointers will be described below.

THE ELEMENTS OF A MODULE

The data storage and data switching in the SSM is composed of pk Elements, where an Element is a random access memory equipped with two sort processing circuits and the requisite latches between switching circuits. The composition of an Element is illustrated in FIG. 12.

A sort processing circuit is a switching system composed of a conventional programmable arithmetic processor equipped to accept corresponding words of two records, rank the first pair of unequal words, and exchange corresponding words in accordance with a signal transmitted to the sort processing circuit.

Rg is a random access register equipped with an address control A and a latch D. Sort Processing Circuits $S_x$ and $S_y$ are identical except for orientation. Sort Processing Circuits $S_x$ and $S_y$ are both designed to accept corresponding words of two records $R_1$ and $R_2$ simultaneously from respective input lines and transmit the word of the larger record $G(R_1,R_2)$ to one of two sort processing circuit outputs and the word of the smaller record $L(R_1,R_2)$ to the other circuit output. If the words which pass to a sort processing circuit are not the least significant words of the record in which they are contained, the state of the sort processing circuit is transmitted to the corresponding circuit of the Element which receives the word of next lower significance. The state of a sort processing circuit indicates whether an inequality of corresponding words has been detected and, if so, which of the words is a word of the larger (smaller) record. The larger of the first (most significant) pair of unequal words of respective records is transmitted to the corresponding circuit output and thereafter words of these records which have lower significance are transmitted without regard to comparison to corresponding outputs.

In FIG. 12, a word of record R1 passes to the Element via $I_1$, a word of record R2 passes from the random access register of the Element, and a word of record $R_3$ passes to the Element via $I_2$. A word of a record passes directly to the random access register of the Element via $I_3$. Output $O_1$ transmits the word of the larger of records $R_1$ and $R_2$ from the Element. $O_3$ transmits the word X where X is defined thus:

$$X = L\{L(R_1,R_2),R_3\},$$

and $O_2$ transmits the word of the larger record $$G\{L(R_1,R_2),R_3\},$$

In this description, the latches D have been ignored. A latch will delay the passage of a word for one word cycle so that the word which passes from $O_2$, for example, will be a word of a record which passed to the Element two word periods earlier.

AN SSM MODULE

Figure 14:
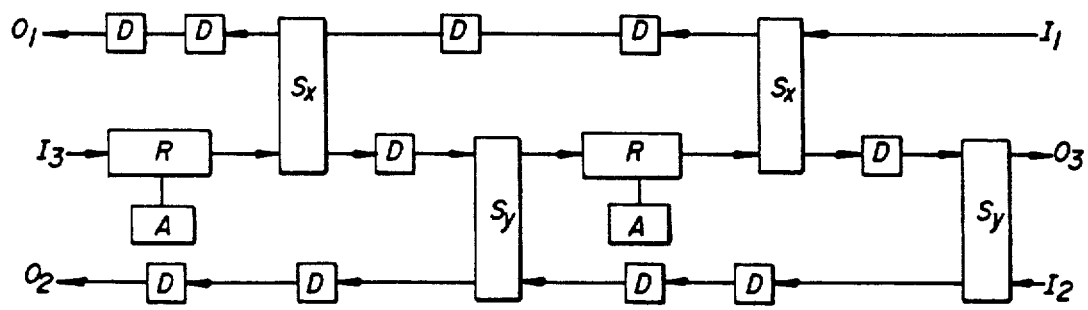
FIG. 14 is a schematic representation of a typical Module in the system.

The composition of an SSM Module is illustrated in FIG. 14 (p=2). The illustration of a Module shown in FIG. 14 may be reduced to the form shown in FIG. 15.

Figure 15:
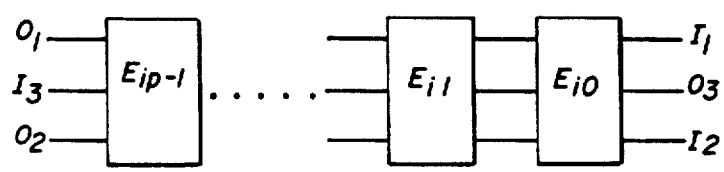
FIG. 15 is a simplified representation of the Module of FIG. 14.
Figure 16:
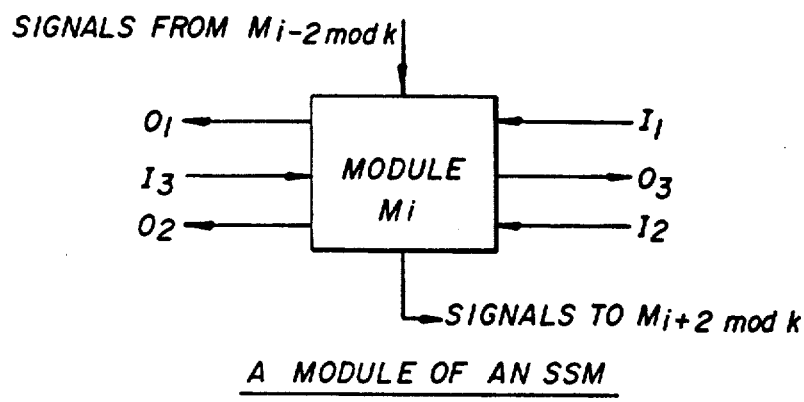
FIG. 16 is a block diagram of a Module of the system.

From the drawing of FIG. 15, it will be seen that a Module must have three input and three output channels corresponding to the three channels of its Elements. A Module may be illustrated in the manner shown in FIG. 14.

Input lines $I_1$, $I_2$, and $I_3$ of Module $M_i$ ($0<i<k-1$) transmit words to the Module $M_i$ from adjacent Module $M_{i+1}$ or $M_{i-1}$ or from an exterior source in the input procedure. Input $I_1$ transmits a word of an input data record from an external data source when $M_i$ is selected to receive a word and otherwise $I_1$ transmits a word from $M_{i-1}$ mod k. In the output mode, $I_1$ transmits a word of a blank record to $M_i$ when $M_i$ is selected to receive a word of a blank, and in the skim mode, $I_1$ of $M_i$ transmits a word of an input data record from the external source if $M_i$ is selected to receive a word. In the input mode, line $I_2$ transmits words of z-blank records when $M_i$ is selected to receive a word, and otherwise transmits the word received from $O_2$ of $M_{i-1\ mod\ k}$. In the output and skim modes, $I_2$ transmits successive words from $O_3$ of $M_{i+1\ mod\ k}$. In the input mode, $I_3$ of $M_i$ transmits words received from $O_3$ of $M_{i+1\ mod\ k}$ in the input mode, and transmits words which pass from $O_2$ of $M_i$ to the random access register of $M_i$ in the output and skim modes.

Output lines $O_i$ (i=1,2,3) transmit words from $M_i$.

Output line $O_1$ in the input mode transmits the word selected in Element $E_{ip-1}$ in $M_i$ in each of the three modes. Output line $O_2$ in the input mode will transmit a word from $M_i$ to $M_{i+1\ mod\ k}$. In the output mode and the skim modes, output line $O_2$ transmits the words it receives from $E_{ip-1}$ to the random access memory of Mi Output line $O_3$ in the input procedure will transmit successive words of the z-blanks transmitted from $I_2$ to the SSM output in the input mode when $M_{i+1}$ receives a word of data record and otherwise transmits the word it receives to the random access register of $M_{i-1}$ mod k In the output procedure, the outputs $O_3$ of each module will transmit a word to the SSM output in cyclic order, so that every fifth word which passes to $O_3$ will pass from the SSM. At any word transmission cycle, if a module is not chosen to transmit a word to the SSM output, $O_3$ transmits a word to a neighboring module via its input line $I_2$.

The Modules are assembled to form an SSM. If k=5, the configuration of Modules will be the one shown in FIG. 17. The Modules may be considered to be at the vertices of a pentagon. The edges of the pentagon represent data paths, and data words pass along the communication lines between the Modules $M_i$ and $M_{i+2\ mod\ k}$ and between $M_i$ and $M_{i-2\ mod\ k}$.

THE STORAGE OF RECORD WORDS IN THE SSM

The storage of words within the SSM is described thus if k=5. Table I (FIG. 19) shows the placement of record words within the five Modules. Let the words of a generic record be denoted a, b, c, d, and e in decreasing order of significance. Subscripts are appended to these words to indicate the level of the cell which contains the records in which the words are included. Table I displays the placement of words in the SSM. From Table I one can see that the first word (the a-word, denoted $a_0$) of a record in a cell at L0 (i.e. the cell $C_{00}$) is in $M_0$ and the last word of this record, its e-word, denoted $e_4$, is in Module $M_3$. Similarly, the d-word of a record in a cell at $L_4$ is in $M_0$.

The successive (data) words of records pass to the SSM in order of decreasing significance, after the requisite pointers are stored, so that the a-word of an input record is the first word of the record to pass to the SSM. The d-word is the last word of this record to pass to the SSM; the e-word is the record pointer. Since in the input mode the pointers are not used, the e-words are placed in the store in preparation for use in the skim or output modes; it is not necessary to transmit the pointers to the SSM when the records are placed in its store. For uniformity, e-words in Table I and Table II are assigned indices, but the index assigned to an e-word is the level of the cell which is to be selected at the next higher level (or to the lowest level $L_0$, if $L_4$ is reached) when the first word of a record is compared. Since there are $p^i$ ($1<i<k$) e-words in module $M_i$, the appropriate one must be selected; this is the e-word of the smallest record in its cell, i.e. the e-word in Element $E_{i0}$ of FIG. 15. When an e-word in an Element is selected in $M_i$, it is transmitted via $I_2$ of $M_i$ so that it will be placed in the appropriate Element for its next retrieval. The sort processing circuit states transmitted from Module $M_{i-2\ mod\ k}$ serve to place the e-word from $I_2$ in the required location in $M_i$.

An e-word transmitted to a Module $M_i$ from $M_{i+2\ mod\ k}$ is the address of the next a-word to be selected in the successive Elements of $M_i$ in the output procedure. This address first passes to the Address Control of Element $E_{i0}$. When the requisite processing is done in $E_{i0}$, i.e. the comparison and/or exchange operations are completed at the address prescribed by the e-word, the address is transmitted to $E_{il}$ and simultaneously the address (e-word) is transmitted from $M_i$ to $M_{i+2\ mod\ k}$ and the successive modules for processing of the words of smaller significance. Similarly, the address is transmitted via $E_{i0}$, ... , $E_{i,h}$,... , $E_{ip-1}$ ($0 \leq h \leq p-1$, $)\leq i \leq k-1$) so that all of the pk Elements of the Cell Sequence will compare words of each record transmitted in the output or skim modes. The e-word transmitted from a module is also retained in the module and placed in the appropriate Element by transmitting the e-word back to the module Element via $I_2$ of the Module as the states of the sort processing circuits are set from signals received from $M_{i-2\ mod\ k}$.

MARK BIT RESETTING

Suppose that the most significant bit of each record in the SSM is 0 and that the first n records of the sorted sequence are to be withdrawn and then returned to the SSM. If a record which returns to the SSM is required for a second output only after all of the records in the SSM have passed from the SSM, the obvious procedure is to append a single bit to each of the records and set this bit to 1 as the successive records pass to the SSM for input. Such a bit will be called a "mark" bit. Now suppose that all of the record mark bits are 1. Clearly this cycle cannot be repeated--an input record with a mark bit set to 1 will not necessarily pass to the SSM store. If, after storage the mark bit of each record is set to 0, input records with mark bits set to 1 can be stored, but this setting of mark bits to 0 requires access to each record in the SSM. Since simultaneous access to all of the records in the SSM is not provided, this setting to 0 of the mark bits of stored records cannot be done in the time required for access to one Cell Sequence. It is for this reason that mark bits are represented by bit pairs. If the stored mark bits are represented by the pair 01, for example, and input records are represented by the pair 10 (this is the juxtaposition of bits '1' and 1 0'; not the first integer greater than nine), suppose the second bits of all of the records in the SSM are set to 0. The result will be that the input records will retain the pair 10 and the stored records will have the pair 00 when the resetting is complete. Similarly, if the stored records have the pair 10 and the input records have the pair 01, it will be sufficient to set the first bits of all of the mark bit pairs to 0. More generally, if M is a binary representation of an integer which represents a record mark and an input record with a mark M' is to pass to the SSM for displacement of the least record with the mark bit M, it is sufficient to subtract 1 from the appropriate position in M if the result will not be negative and $M' > M$. This manipulation of mark bits is one of the reasons for mention of use of sort processing circuits in place of simple sort circuits described elsewhere in the literature.

ADDRESS WHEN ALTERNATE INPUT AND OUTPUT OPERATIONS ARE EXECUTED

Blank records (records larger than any data record) can be used to indicate the succession of empty record storage positions in the SSM. In the output procedure, the first blank to displace a data record will be stored in a cell at $L_{k-1}$. The next blank record can then be used to store the address of the first blank so that exterior storage of the address of the second blank will suffice to identify the two blank locations. This procedure can clearly be extended to include the locations of all but one of the blanks in the SSM. If after withdrawal of some, but not all of the data records, it is thus possible to resume input of data records which will then become members of the collection of records within the SSM.

This procedure of using blanks to identify record storage positions is trivial if output of all of the records in the SSM precedes each input procedure, or input and output record sequences were always disjoint, as would be the case if the SSM were used only as a sorting machine, i.e. if marked records were used to displace successive members of the sorted sequence within the SSM so that many sorted sequences could be obtained. But if blank spaces are randomly distributed after withdrawal of some, but not all, of the SSM records, the blanks which are inserted when records are withdrawn can be assigned addresses so that the preceding address of the record storage position at $L_{k-1}$ from which a record was taken can be identified. This requires that a blank with an address must remain in the cell $C_{k-1,j}$ to which it is assigned until all of the blanks in cells of the Cell Sequence which includes $C_{k-1,j}$ have been displaced. This in turn requires identification of any blank B which contains an address so that B will not be displaced by another blank. One way to mechanize this operation can be described thus. In an input operation, if a blank B passes to a sort processing circuit and also B passes to that sort processing circuit, B will be treated as the smaller record In an output operation, B will be treated as a record larger than any blank record B with which it is compared. B will then pass to the highest level in the selected Cell Sequence and will remain at the highest level until it passes to a sort processing circuit and is compared with a data record and is thus displaced from the SSM.

The invention provides, therefore, an improved self-sorting memory system which is made up of a number of identical Modules, each of which is composed of standard, conventional random access storage registers and associated relatively simple switching circuits.

While a particular embodiment of the invention has been shown and described, modifications may be made, and it is intended in the appended claims to cover all such modifications which fall within the spirit and scope of the invention.

I claim:

1. A self-sorting memory system for sorting a plurality of multi-word records into an ordered sequence, the system including: a plurality of modules intercoupled to one another and each module including memory means for storing a different word of each of the records and the memory means collectively forming a composite storage memory means for storing the records; said storage memory means being partitioned into cells, with different numbers of cells in different parts of the partition with the different parts representing different sorting levels; input circuit means for serially introducing each word of the records to be sorted to respective ones of the modules; circuit means included in each of the modules for comparing the respective words of a record feed into the modules with respective words of a record previously entered into the modules and for passing comparison results to the next module to cause the smaller record, with a pointer pointing to the cell at the next higher level to which the larger record is displaced, to be stored in a memory cell representing a first sorting level in the composite storage memory means and to cause the larger records to be displaced to memory cells representing the next higher sorting level, which comparison and displacement is carried out progressively to the highest sorting level, such that each record in any one of said memory cells in the composite storage memory means representing a particular sorting level is smaller than any of the records in the corresponding memory cell representing the next higher sorting level; and control circuitry included in the modules for causing the modules to output records in an ordered sequence by selecting the smallest record in the first sorting level, which record is replaced by the smallest of the records in the cell identified by the pointer of the smallest record at the next lower sorting level and the replacement is carried out progressively to the highest sorting level.

2. The system defined in claim 1, in which the storage memories in each of the modules has the same storage capacity.

3. The system defined in claim 1, in which the storage memories are of the random access type.

4. The system defined in claim 1, and which includes circuit means for preparing the system to accept input records for storage by the establishment of an input operation during which records to be sorted are serially introduced into the system, and for preparing the system to output records by the establishment of an output operation during which records are outputed from the system in a sorted sequence.

5. The system defined in claim 4, and which includes control circuitry in each of the modules for causing the modules to assume a particular circuit configuration during the input operation and a different circuit configuration during the output operation.

6. The system defined in claim 4, and which includes storage means for storing pointer words in the system during the input process to prepare the records for the output process.

7. The system defined in claim 6, in which said pointer words are appended to corresponding ones of the records introduced into the system during the input process.

8. The system defined in claim 16 and which includes initially filling the composite storage means with blank records greater than any record to be sorted, which blank records are displaced output of the composite storage means during the input process.

9. The self-sorting memory system defined in claim 1, in which the first level memory cell contains a predetermined number p of records and the second level memory cell containing p clusters of p records with a deplacement pointer pointing to a record in the first level, and the progression $p, p^2, ... p^{k-1}$ continues to the higher levels.

10. The self-sorting memory system defined in claim 9, in which, the cluster of the higher level to which a record of the lower level is displaced is randomly selected.

* * * * *

UNITED STATES PATENT AND TRADEMARK OFFICE
CERTIFICATE OF CORRECTION

PATENT NO. : 5,204,967
DATED : April 20, 1993
INVENTOR(S) : Philip N. Armstrong

Figure 17:
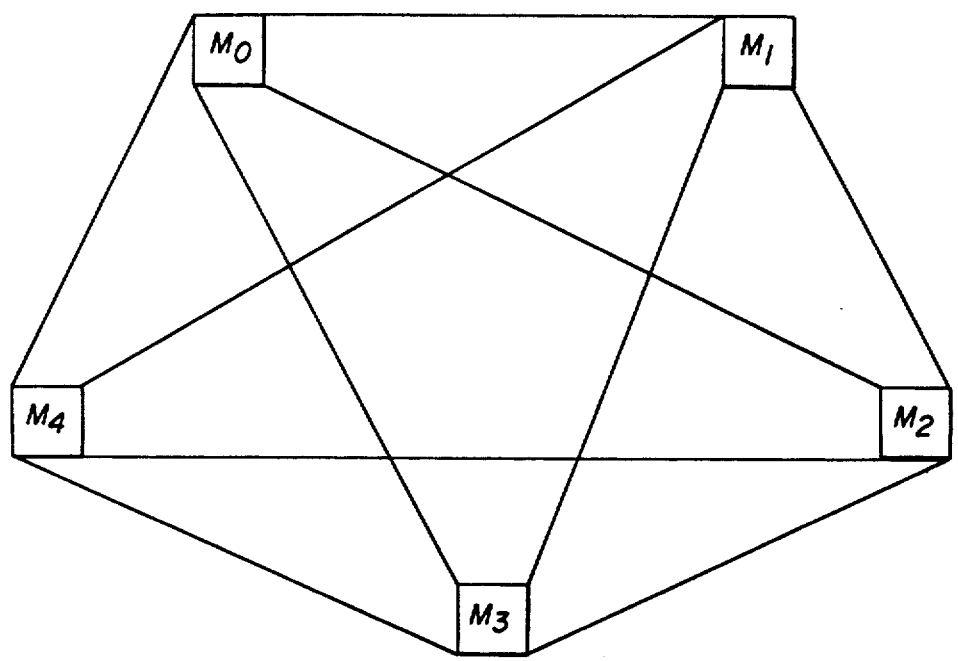
FIG. 17 is a representation of the manner in which a number of Modules may be interconnected.
Figure 18:
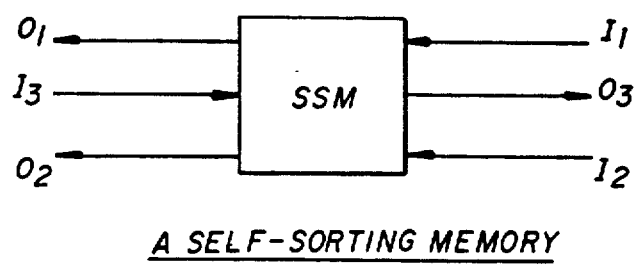
FIG. 18 is a block diagram of the Self-Sorting Memory of the invention.
Figure 17:
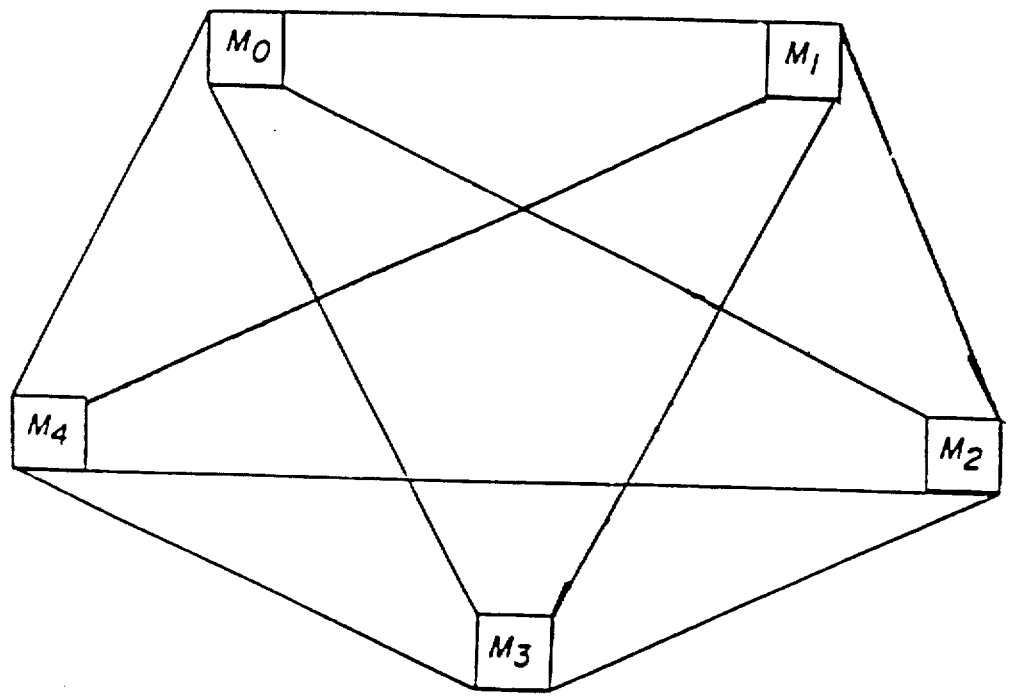

It is certified that error appears in the above-indentified patent and that said Letters Patent is hereby corrected as shown below:

The sheet of Drawing consisting of Fig. 17, should be deleted. The attached sheet of Fig 17 should be added--.

Signed and Sealed this

First Day of February, 1994

Attest:

BRUCE LEHMAN

*Attesting Officer*     *Commissioner of Patents and Trademarks*